(12) United States Patent
Slobodnik et al.

(10) Patent No.: US 7,053,675 B2
(45) Date of Patent: May 30, 2006

(54) SWITCHING BETWEEN CLOCKS IN DATA PROCESSING

(75) Inventors: Richard Slobodnik, Austin, TX (US); Gerard Richard Williams, Sunset Valley, TX (US); Mark Allen Silla, Hutto, TX (US)

(73) Assignee: ARM Limited, Cambridge (GB)

( * ) Notice: Subject to any disclaimer, the term of this patent is extended or adjusted under 35 U.S.C. 154(b) by 7 days.

(21) Appl. No.: 10/626,871

(22) Filed: Jul. 25, 2003

(65) Prior Publication Data

US 2005/0017763 A1    Jan. 27, 2005

(51) Int. Cl.
*G06F 1/04* (2006.01)
(52) U.S. Cl. .......................................... 327/99; 327/298
(58) Field of Classification Search ................ 327/144, 327/142, 99, 293, 298, 407
See application file for complete search history.

(56) References Cited

U.S. PATENT DOCUMENTS 5,357,146 A * 10/1994 Heimann .................... 327/292
5,675,615 A * 10/1997 Watt ........................... 375/354
6,653,867 B1 * 11/2003 Shihadeh .................... 326/96
6,782,064 B1 * 8/2004 Schwake .................... 375/354

* cited by examiner

*Primary Examiner*—Kenneth B. Wells
*Assistant Examiner*—Cassandra Cox
(74) *Attorney, Agent, or Firm*—Nixon & Vanderhye P.C.

(57) ABSTRACT

A processor clock control device is disclosed that is operable to control switching between clock signals input to a processor in a glitch-free way. The processor clock control device comprises: at least two clock signal inputs each operable to receive a clock signal, said clock signals comprising a first and a second clock signal; a sensor operable to sense said first and said second clock signals; a clock signal output operable to output a clock signal for input to a processor; and a clock switching signal input for receiving a switching signal operable to control switching of said clock signal output from said first clock signal to said second clock signal; wherein said processor clock control device is operable on receipt of said clock switching signal to sense said first clock signal and when said first clock signal transitions from a first predetermined level to a second level, said processor clock control device is operable to hold said clock signal output at said second level, and then to sense said second clock signal and when said second clock signal transitions from said second level to said first predetermined level to output said second clock signal.

19 Claims, 11 Drawing Sheets

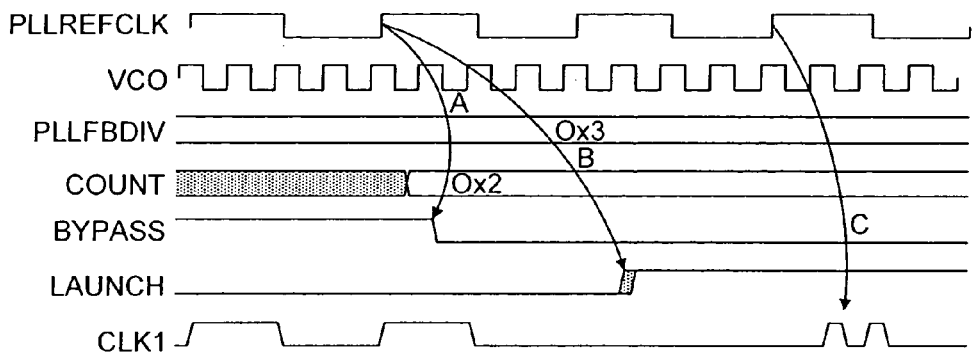

A: BYPASS toggles from tester pad after a rising edge of reference clock. Arrival must be within one PLLREFCLK, and not necessarily within one phase.

B: The asserting edge of the LAUNCH signal enables the generation of CLK1 in the VCO domain. LAUNCH must arrive at least one PLLREFCLK cycle after BYPASS toggles. Similar to BYPASS, LAUNCH arrives within one PLLREFCLK.

C: CLK1, in the VCO domain, is generated within the next PLLREFCLK cycle after LAUNCH is received. The start of CLK1 should begin within one PLLREFCLK cycle. The alignment to the PLLREFCLK phase is not specifically required.

Notes: It is illegal for BYPASS or LAUNCH to re-toggle before the appropriate number of CLK1 pulses is generated (except for indefinite mode). All PLL input control must have proper slew rate to guarantee the behaviour described.

FIG. 12

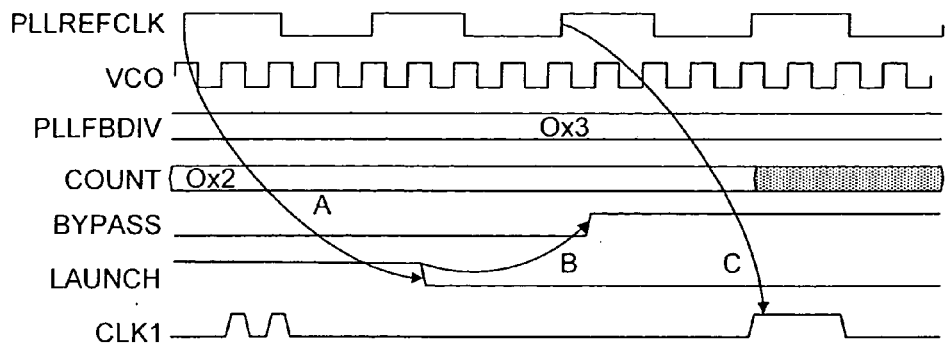

A: LAUNCH is de-asserted one PLLREFCLK cycle after the required number of CLK1 pulses, in the VCO domain, have been generated. This de-assertion of LAUNCH will vary as a function of COUNT, PLLFBDIV, design implementation, and is the responsibility of a DFT Engineer to generate a sufficient number of cycles in the test program to guarantee behaviour.

B: BYPASS must be asserted at least one PLLREFCLK cycle after LAUNCH de-assertion.

C: CLK1, will track the PLLREFCLK in the cycle following BYPASS assertion.

Notes: If design implementation requires additional cycles to transistion (eg: requires a second PLLREFCLK before CLK1 = PLLREFCLK,) this may be allowed. Any change in CLK1 behaviour as a function of BYPASS must be 100% determinstic with respect to the cycle counts specified

FIG. 13

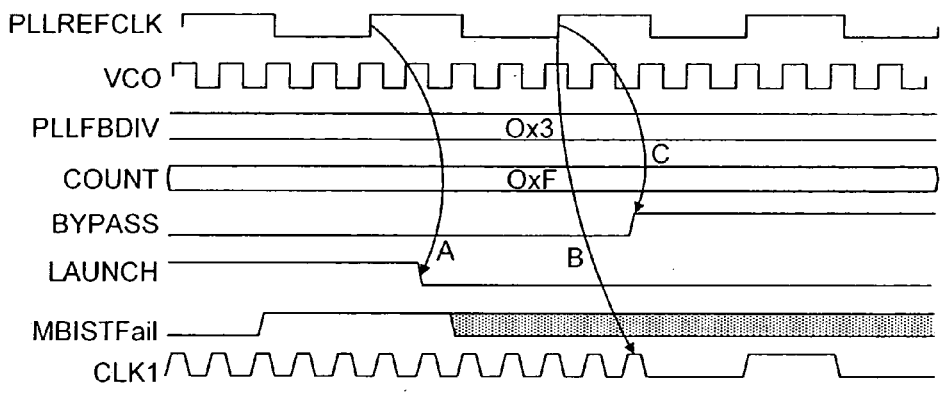

A: LAUNCH is de-asserted by the tester one PLLREFCLK cycle after MBIST failure is detected.

B: CLK1, in the VCO domain, should terminate in the next PLLREFCLK cycle after LAUNCH de-assertion. Because the MBIST controller is in a stalled state, the number of CLK1 pulses delivered is not of concern; however, the exact PLLREFCLK cycle must be known.

C: BYPASS may be asserted as early as the first cycle following LAUNCH de-assertion or in any later PLLREFCLK cycle.

Notes: MBISTFail is not a PLL specifiied signal but is shown here as trigger machanism for test action. Once the tester has de-asserted LAUNCH, MBISTFail is used as a datalog output.

FIG. 14

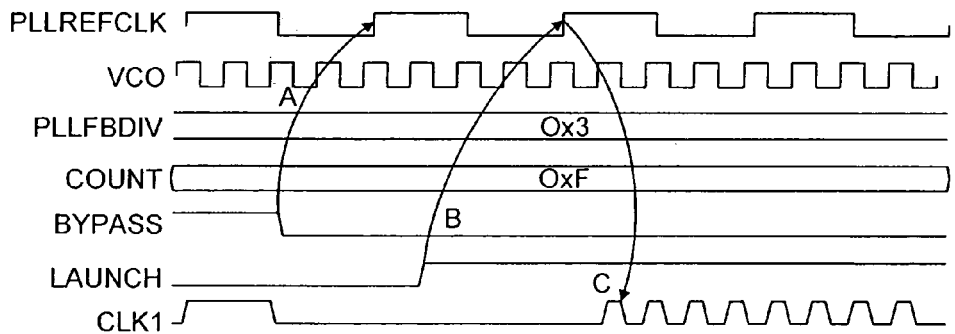

A: The de-assertion of BYPASS, masks all subsequent CLK1 pulses, in the PLLREFCLK domain.

B: The assertion of LAUNCH enables CLK1 pulses to be generated in the VCO domain in subsequent PLLREFCLK cycles.

C: CLK1 generation in the VCO domain begins less than two VCO pulses after the PLLREFCLK rising edge.

Notes: Although similar to functional mode in switching between VCO and PLLREFCLK clock domains, the determinsitic behaviour of the LAUNCH signal is required for generation of tester vector sets. Example: A PLLREFCLK, creating event C, will strobe for an MBIST failure with expectations that at least one CLK1 pulse has been generated (strobe in the later half of PLLREFCLK cycle).

FIG. 15

SWITCHING BETWEEN CLOCKS IN DATA PROCESSING

BACKGROUND OF THE INVENTION

1. Field of the Invention

This invention relates to the field of data processing systems. More particularly, this invention relates to the field of switching between different clocks in data processing systems 2. Description of the Prior Art When switching between clocks in a data processing system, if the switching is not controlled then glitches, or skinny/runt pulses can occur. This can cause problems with the processing system and is better avoided. FIG. 1 shows an example of a glitch pulse being produced when uncontrolled switching from a slower REF clock to a faster clock occurs.

One way of addressing this problem is with the use of registers which control the time at which the switching is allowed. In the embodiment shown in FIG. 2, the switch is relayed through clocked registers, such that when the ref-clock is low, at point shown by dotted line (1), the switch signal is passed to the next register, register 2 then when the fstclk goes high dotted line (2), it passes to the next register, register 3, and when fstclk falls low, dotted line (3), the switch is operable and the clock output switches from the ref clock to the fast clock. This system ensures that the refclock is low (and thus the output clock is low) when the clocks switch and also that the fast clock has just switched to its low value at this point. Thus, it ensures that we switch from a low clock level to a low clock level and that we switch at the start of the fast clock's low pulse thereby ensuring both clocks are low and thus no smaller pulses or glitches can be produced. This system only works if refclk does not switch during stage 2 and 3 (between dotted lines 2 and 3), i.e. while the fstclk is in the high state. In other words it will only work when switching from a slower to a faster clock and not vice versa.

It would be desirable to provide a glitch-free or at least reduced glitch way of switching between clocks in either direction, i.e. from both a slower to a faster clock and from a faster to a slower clock.

SUMMARY OF THE INVENTION

Viewed from one aspect the present invention provides a processor clock control device operable to control switching between clock signals input to a processor, said processor clock control device comprising: at least two clock signal inputs each operable to receive a clock signal, said clock signals comprising a first and a second clock signal; a sensor operable to sense said first and said second clock signals; a clock signal output operable to output a clock signal for input to a processor; and a clock switching signal input for receiving a switching signal operable to control switching of said clock signal output from said first clock signal to said second clock signal; wherein said processor clock control device is operable on receipt of said clock switching signal to sense said first clock signal and when said first clock signal transitions from a first predetermined level to a second level, said processor clock control device is operable to hold said clock signal output at said second level, and then to sense said second clock signal and when said second clock signal transitions from said first predetermined level to said second level to output said second clock signal.

By controlling the switching such that the clock signal that is output is held at a chosen one of its two levels when the output signal is at the start of that cycle, i.e. it has just switched to that level, and then monitoring the clock signal to be output and ensuring that switching to the new signal occurs just when this clock signal switches this level, i.e. at the start of its cycle, it is ensured that at switching at least a whole pulse of the new output clock is output and thus, no short or runt pulses are produced. This works both when switching from a slower to a faster clock signal and from a faster to a slower. Thus, on the fly switching can be safely performed between different clocks.

In some embodiments, said output control device is operable to sense said first clock signal and if said first clock signal is at said second level when said switching signal is received said output control device is operable to hold said output at said second level.

In some circumstances, such as in test mode, it is important to inhibit further clock cycles once the switching signal has been received until the "new" or second clock is ready to be output. This is because in test mode, the state of the processor at the moment that the switching signal is received is wanted and not the state any steps later. Embodiments of the present invention address this problem by holding the clock at the second level, if it is at this level when the switching signal is received and thereby not allowing it to transition to its other level. If it is at the other level when the switching signal is received then it is allowed to switch to the level at which it is to be held (the so called second level) prior to holding it.

In some embodiments said processor clock control device further comprises a further clock switching signal input operable to receive a further switching signal, said processor clock control device being operable to sense said second clock signal only after receipt of said further switching signal.

In some circumstances such as in test mode, it may be desirable to delay switching to the second clock by an amount that can be controlled by an external input "a further switching signal". In the case of test mode this is desirable in some circumstances where, for example, a scan chain needs to be enabled and this may take several cycles of the clock. Thus, in order to prevent the clock signal that is to be used to clock the output of the scan chain from starting before the scan chain is enabled an additional signal is used, such that extra control is provided and the system can run safely.

In some embodiments said further switching signal comprises a switch signal component and a number component, said output control device being operable to sense said second clock signal only after receipt of said switch signal component and to output said second clock signal for a number of cycles specified by said number component.

In some circumstances it is desirable to switch clock signals for a specified number of cycles. This is true in some circumstances in test mode. The provision of a further control signal allows this number of cycles to be specified.

In some embodiments, said clock switching signal input further comprises logic operable to inhibit forwarding of said received clock switching signal to said processor clock control device until said first clock signal reaches said first predetermined level.

It may be preferable to provide a synchronised switching instruction which only arrives when the clock signal being output is at a certain level. As it is the transition of the clock from this level to the other level that triggers the next event in the switching cycle, this synchronisation of the switching instruction can be helpful, as it is not useful to receive the switching signal before this point in most cases. This is particularly so if the first clock is the slower of the two clocks and is a reference clock. In some cases, however, such as in test mode, it is important to stop the output clock as soon as safely possible after receiving a switching signal and thus for these embodiments this synchronisation of the switching instruction is not used.

It is generally desirable to prevent the switching signal from changing and thereby indicating switching to a different clock midway through a clock switching procedure. This is because if this were allowed, a glitch or unsafe switching may occur. Thus in preferred embodiments following receipt of a clock switching signal said clock switching signal input is inhibited from receiving further signals until said processor clock control device outputs said second clock signal.

Although the above can be done in a plurality of different ways, in preferred embodiments said logic operable to inhibit forwarding of said received clock switching signal to said processor clock control device comprises a register that is clocked by said first clock signal at said first predetermined level.

In preferred embodiments, said processor clock control device comprising a plurality of set/reset flip-flops and logic gates.

The functionality required of the present invention allows it to be realised in preferred embodiments by SR flip flops and logic gates. Thus, an asynchronous state machine is used to control switching between clocks and provide a switching mechanism that avoids glitches.

Although in many embodiments the processor control device controls switching between two clocks, in other embodiments the processor control device comprises a further clock signal input.

Embodiments of the present invention are able to deal with a plurality of clocks, the logic used to select the clock simply being increased to deal with the additional clocks.

A further aspect of the present invention provides a processing apparatus comprising: a processor comprising a clock signal input; at least two clocks each operable to output a clock signal; and a processor clock control device according to a first aspect of the present invention, said processor clock control device being operable to control which one of said at least two clock signals is to be input to said processor clock signal input.

A yet further aspect of the present invention provides a method of switching between clock signals to be output comprising the following steps: outputting a first clock signal; receiving a clock switching signal; sensing a first clock signal and when said first clock signal transitions from a first predetermined level to a second level, holding said sensed first clock signal at said second level and outputting said held signal; sensing said second clock signal and when said second clock signal transitions from said first predetermined level to said second level outputting said second clock signal.

Further aspects of the present invention are set out in the appended claims.

The above, and other objects, features and advantages of this invention will be apparent from the following detailed description of illustrative embodiments which is to be read in connection with the accompanying drawings.

BRIEF DESCRIPTION OF THE DRAWINGS

FIG. 12 shows an ATPG clock sequence, load-unload to capture clocks (4:1);

FIG. 13 shows an ATPG clock sequence going from fast to slow clock, load-unload to capture clocks (4:1);

FIG. 14 shows a BIST clock sequence, CLK1 (4:1) to PLLREFCLK;

FIG. 15 shows a BIST clock sequence, PLLREFCLK to CLK1 (4:1);

DESCRIPTION OF THE PREFERRED EMBODIMENTS

With reference to FIG. 3, switching between a reference slower clock (REFCLK) and a faster clock (FSTCLK) in both directions is schematically shown. In this embodiment glitches and runt pulses in the clock signal are inhibited by requiring the following steps to occur before switching between the clocks is allowed. First the clock signal that is being output must go from high to low, and then the output is held low and then the clock being switched to must be monitored and when it goes low the output can be switched.

Figure 1:
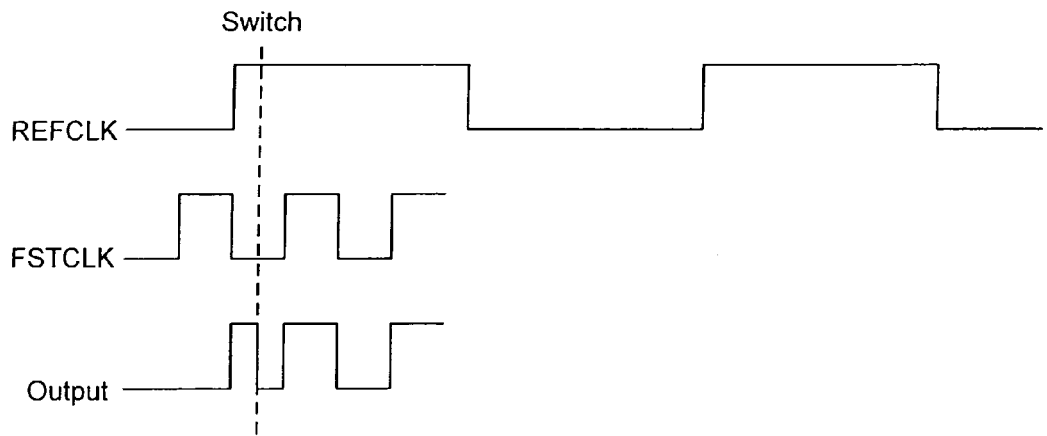
FIG. 1 schematically shows a conventional glitch-prone way of switching between clocks.
Figure 2:
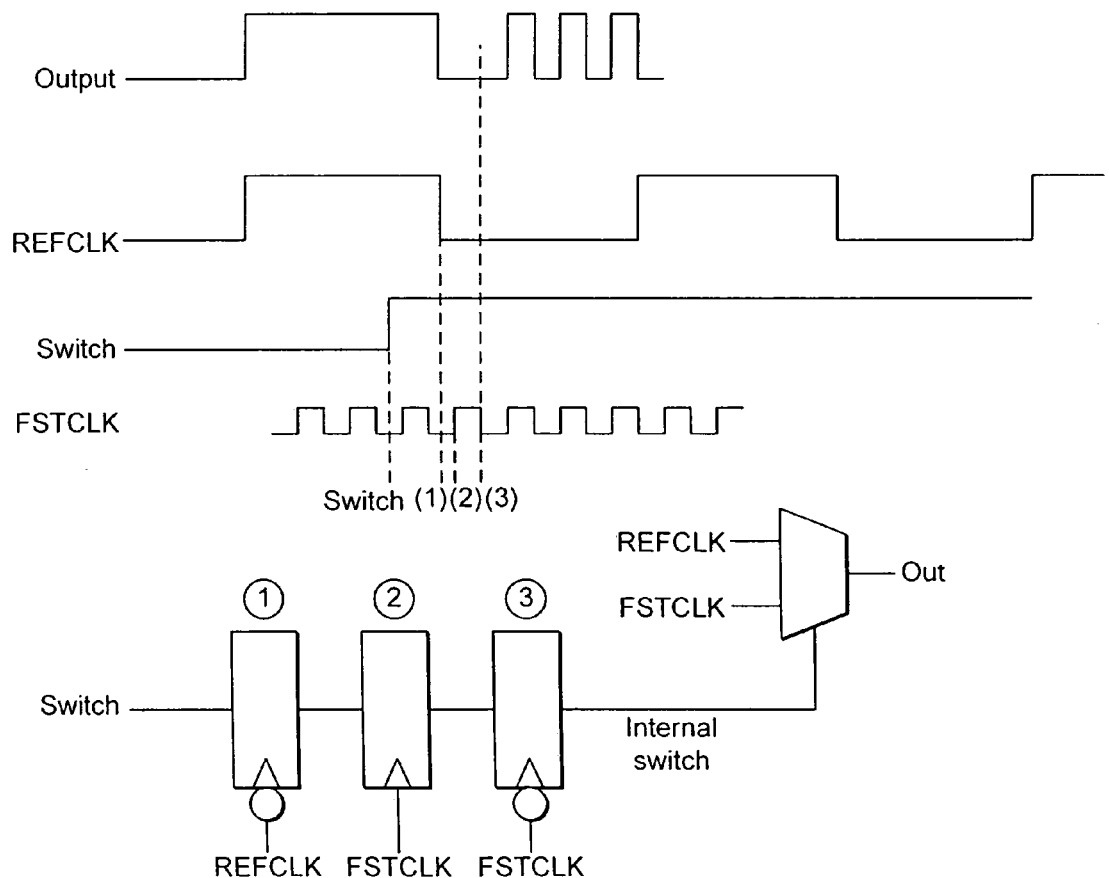
FIG. 2 schematically shows a known way of switching from a slower to a faster clock.
Figure 3A:
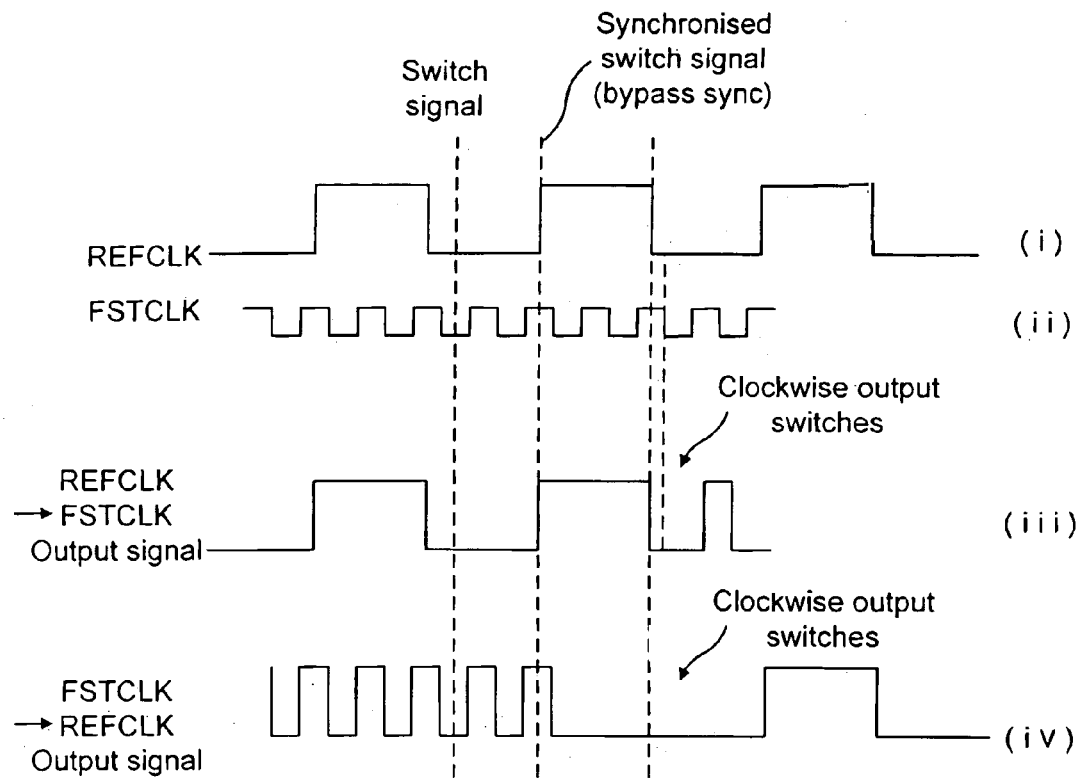
FIG. 3A schematically shows the output clock when switching between clocks in functional mode according to an embodiment of the present invention.

Line (i) of FIG. 3A shows the slow or REFCLK, line (ii) shows the faster clock FSTCLK and line (iii) shows switching from REFCLK to FSTCLK. Line (iii) shows the switching signal being received when REFCLK is low. In this embodiment the switching signal is "synchronised" and is not transmitted to the clock switching control device until the reference clock is high. This triggers the switching signal to be passed to the clock switching control circuit, this signal is shown in FIG. 3A as bypass sync. Once this has been received the clock switching control device then looks for REFCLK to be high and then fall low, this triggers the output to be held low and FSTCLK to be looked at. In the example shown FSTCLK is high at this point and when it falls low this triggers the output device to switch clock outputs and to output the FSTCLK. Thus, the output has switched from REFCLK to FSTCLK without any glitches, as the point at which switching occurred was controlled.

The means of control according to embodiments of the invention is such that it will also provide switching from FSTCLK to REFCLK that is free from skinny or runt pulses. This is shown in line (iv), here the switch signal occurs when FSTCLK is being output and FSTCLK is low. Once again the switching signal is synchronised and is passed to the clock switching control device when REFCLK goes high (bypass sync). Then when the output signal (FSTCLK) falls low the output is held low and the device looks at REFCLK. At this point REFCLK is high, so the device waits for it to fall low. At this point the device switches to REFCLK and as can be seen no glitches or runt pulses are produced. Waiting for a high to low transition of both the clock being output and the clock to be output before switching ensures there is always a full phase of the low clock pulse of the clock being switched to, to perform required work.

Figure 3B:
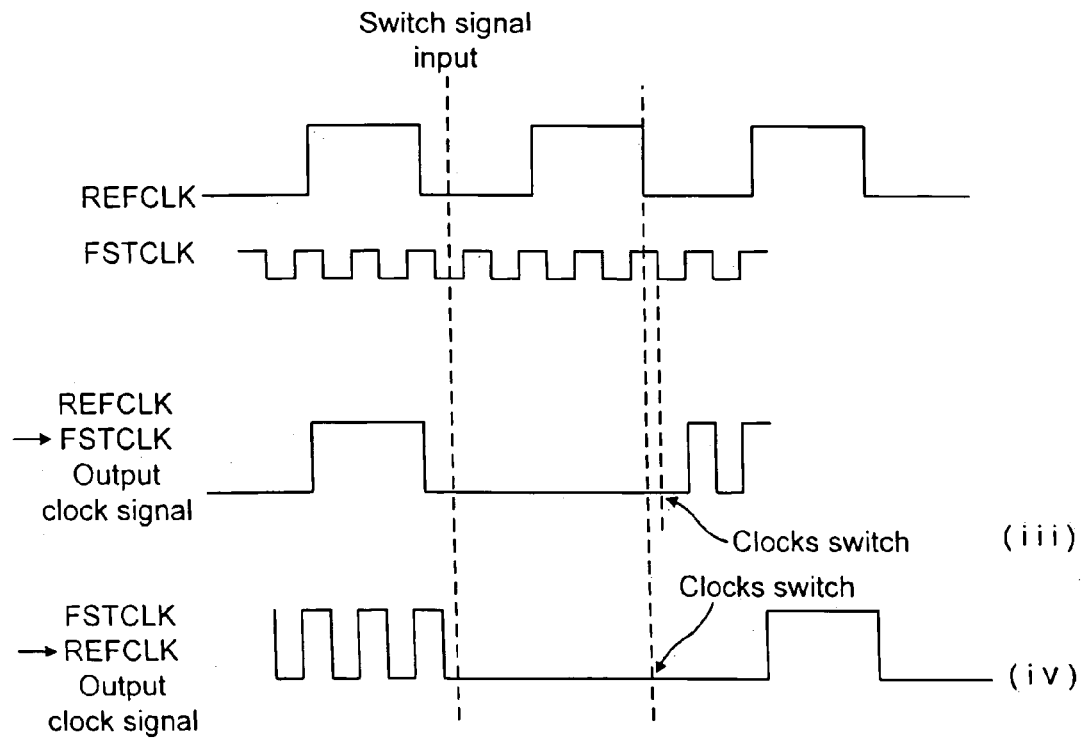
FIG. 3B schematically shows the output clock when switching between clocks in test mode according to an embodiment of the present invention.

FIG. 3B shows switching between clocks in a "test" mode. Test mode is a particular mode, wherein the processor is being tested to check that it meets certain criteria. This testing requires clock speeds to be changed, as the testing may occur at a fast normal processing speed, whereas data may need to be output from the processor to be verified at a lower speed. In this mode the switching signal is not synchronised in any way but is directly input to the switching control device. Line (iii) shows switching from REFCLK to FSTCLK. As can be seen following receipt of the switching signal, the switching control device senses that the reference clock is low and it holds the output clock low. If REFCLK were not low it would wait until it switched low and then it would hold the output clock low. In this embodiment the output clock is not allowed to go high and then low again as this would cause the processor to perform a further step and it is the state of the processor at the particular moment the "switch" signal is received that is required. The switching device senses when the reference clock switches from high to low and when this occurs it senses the faster clock. When the faster clock switches from high to low then the switching control device enables the FSTCLK output.

Line (iv) shows switching from the faster clock to the reference clock, also in the test mode. Once again when the switch signal is received the FSTCLK is low and thus the switching control device acts to hold the clock output low. If it were high it would be allowed to be output until it falls low and then the output would be held low. Then when the switching control senses the FSTCLK switching from high to low, it looks at REFCLK and when this switches from high to low it enables the REFCLK output.

Thus, as can be seen switching between fast and slow and slow and fast clocks can be performed. The ability to switch in both directions is useful in many systems. For example, in devices such as mobile phones where it may be useful to be able to switch between high power mode where the clock speed is faster and games can be played to a normal mode requiring less processing power and thus a slower clock can be used and back again at will.

Figure 4:
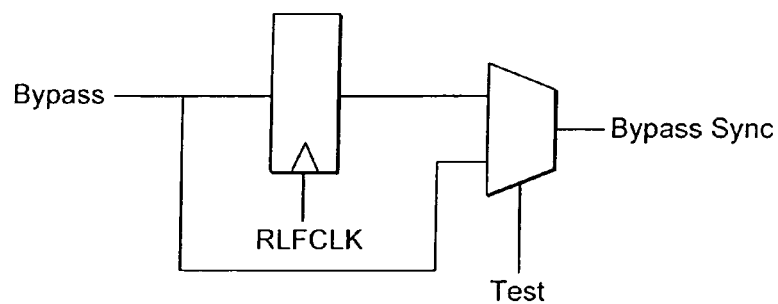
FIG. 4 schematically shows a circuit for synchronising the switching signal.

FIG. 4 shows a way of synchronising the bypass signal that may be used in some embodiments (for example functional mode illustrated in FIG. 3A). It may be desired for the bypass signal only to be received by the switching control device when clock A is high. To ensure that this occurs the bypass is passed through a register which is clocked by the reference clock signal. In other embodiments such as when testing a chip (see FIG. 3B) it may be important that the bypass signal is received as soon as it is given and that the clock is tied low as soon as possible after this. In order to provide for this scenario there is a gate that can select for the bypass signal to pass through in the test scenarios and for the bypass sync signal to pass through in other scenarios.

Figure 5:
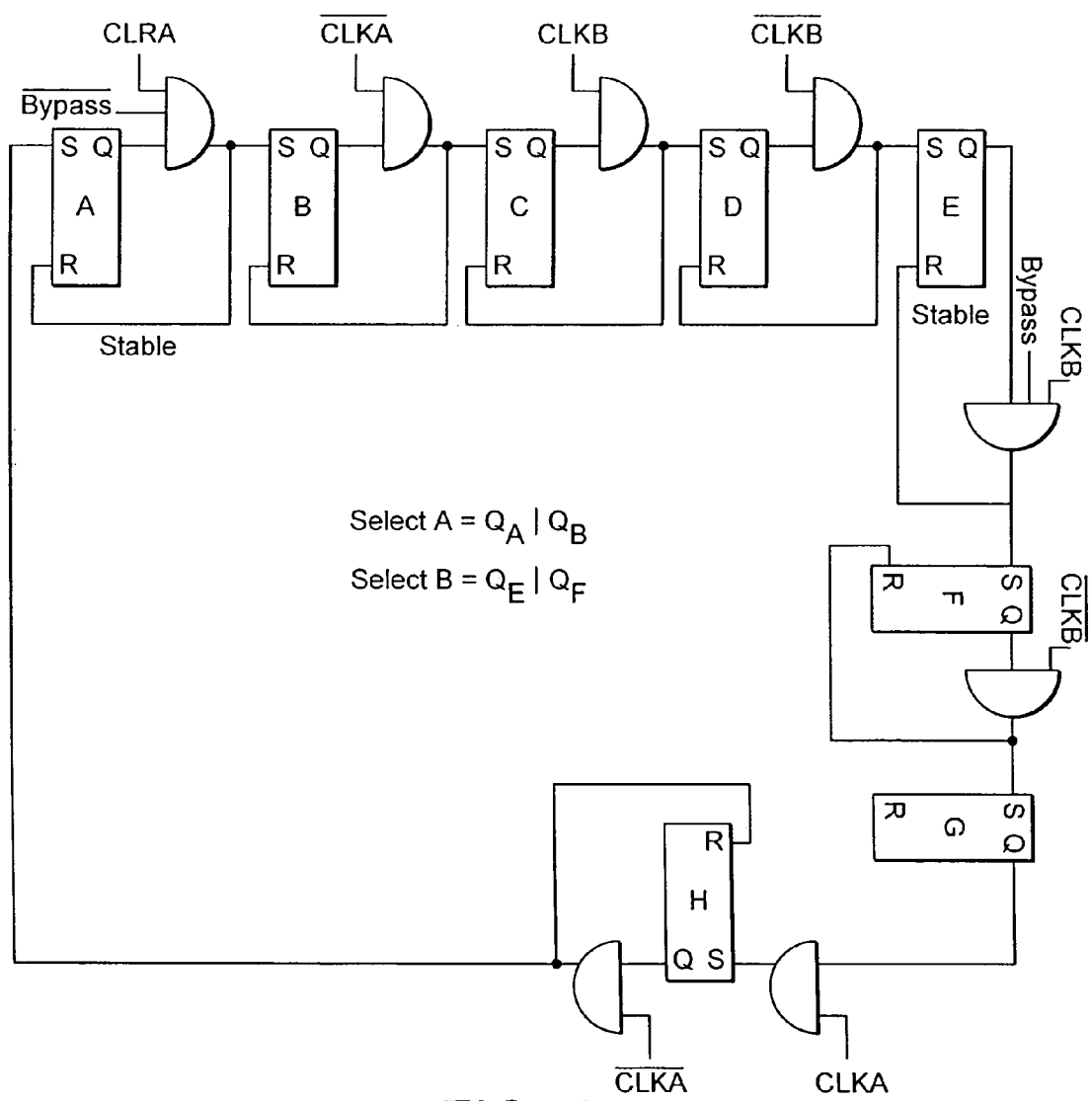
FIG. 5 schematically shows a circuit for a processor clock switching control device according to an embodiment of the present invention.

FIG. 5 schematically shows a circuit operable to control switching between two clocks A and B for input to a processor according to an embodiment of the present invention. As can be seen this switching control device is implemented using logic gates and SR flip-flops. Starting at state A, which is the initial state where clock A is being input to the processor. In the embodiment illustrated bypass is the switching signal, bypass being high indicating clock A should be input to the processor and bypass being low indicating that clock B should be input to the processor. Thus, when NOT bypass goes high, i.e. a low bypass signal is received indicating that clock B is now to be output, the output of the AND gate is no longer tied low and can go high and this would set the next flip flop. There is a feedback loop, so that state A flip flop is reset by the same signal that sets the next flip flop. State A switches to state B only when clock A is high, as is indicated by the AND gate following flip-flop A. Progressing from state B to state C occurs when clock A drops low.

Figure 6:
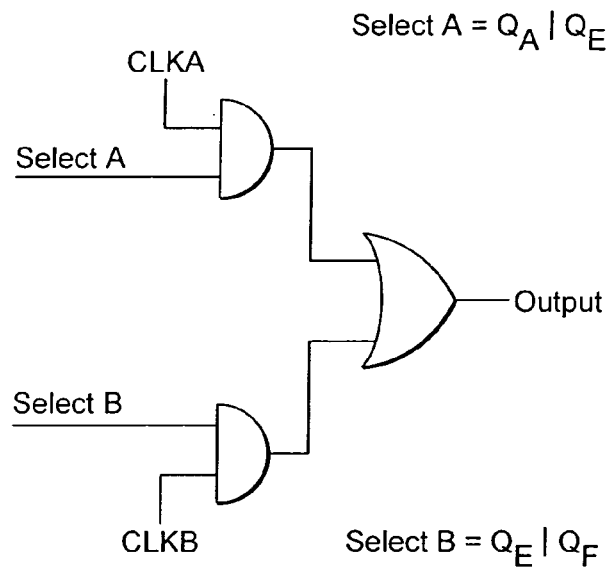
FIG. 6 schematically shows the output stage of the processor clock switching control device according to an embodiment of the present invention.

Logic (not shown) ensures clock A is selected in either state A or state B, when we have left state B clock A is no longer selected and the output is gated. As we left state B when clock A was low the output is tied low. FIG. 6 shows how the signals are selected in more detail and will be explained later. State C is left when clock B is high and state D is then left when clock B falls low. State E is what is known as a stable state and clock B is at this point output to the processor. Thus, we have switched from clock A to clock B and we remain in state E until a further change in the bypass signal.

To move further we need a high bypass signal to be received and when this is received and clock B is low we pass to state F. When clock B falls low we pass to state G and at this point clock B is no longer output and thus the output clock is held low. From state G we pass to state H when clock A is high and from state H back to state A when clock A drops low. Thus this illustrates the switching of clock B to clock A.

In the embodiment shown, the bypass signal is only input to the gates, when the device is in a stable state (state A and E). In order to prevent any problems arising from this signal changing levels while the device is in the process of switching, in many embodiments, this signal is prevented from changing until a stable state (state A or E) is attained. In some embodiments this is done using synchronisation registers. These registers are allowed to be updated only if states A or E are active, preventing potential mid-switch hazards. This is very similar to the synchronisation register that is used to synchronise the bypass signal in some embodiments and is illustrated in FIG. 6.

Synchronization logic which allows a switch to the fast clock domain may also include a PLL LOCK indication which also insures that the fast clock output is at expected frequency prior to enabling the fast clock domain for output.

As can be seen FIG. 5 illustrates an asynchronous state machine for controlling switching between clocks input to a processor.

FIG. 6 shows one embodiment for implementing selections of clock A and clock B in response to signals from the circuit of FIG. 4. The select A and select B lines are activated in certain circumstances. The select A line is activated in either state A or state B and the select B is activated in either state E or state F. In other words select A is $Q_A$ "OR"ed with $Q_B$ and select B is $Q_E$ "OR"ed with $Q_F$.

Although FIG. 6 shows the selection between two clocks, embodiments of the present invention are not limited to this. Additional clocks may be added to the circuit shown in FIG. 6, each with their own select line. The select line signal being produced by flip flops and gates as shown in FIG. 4 for clkA and clkB.

Figure 7:
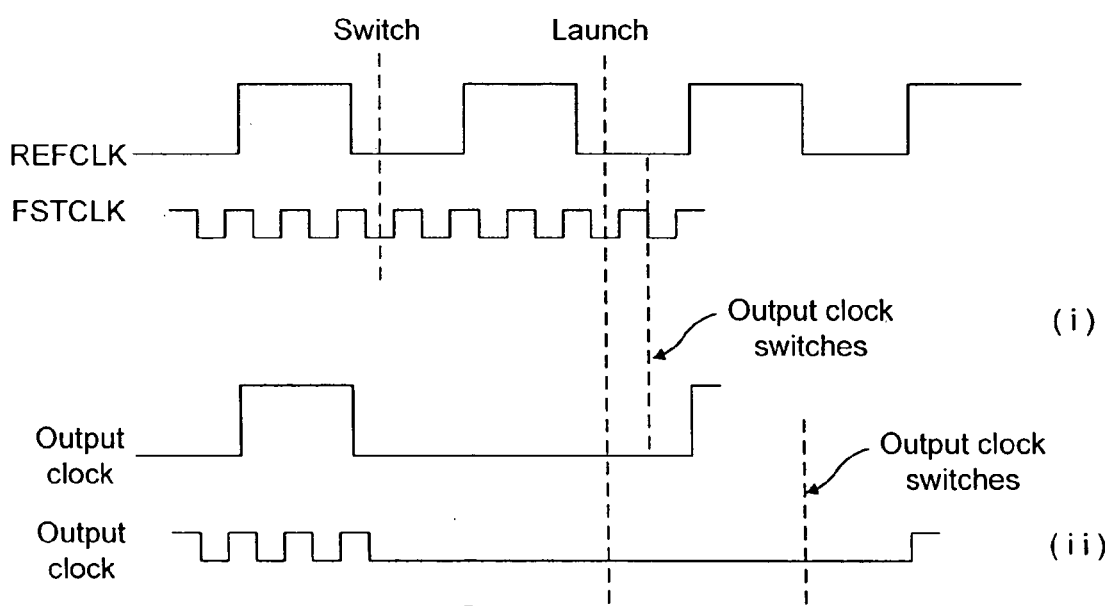
FIG. 7 schematically shows the output clock when switching in test mode according to an embodiment of the present invention.

FIG. 7 schematically shows the output of a clock switch in test mode similar to that in FIG. 3B, but with an additional "launch" signal being present. Line (i) represents switching from the slower to the faster clock and line (ii) from the faster to the slower clock. This embodiment involves a test sequence, where a chip is being tested under a design for test scenario. In this case it is important that as soon as the bypass signal is received the device stops clocking. It is also important here to prevent the new clock from starting clocking until the device is ready for it. This is where the launch signal comes in. This launch signal basically prevents output of the new clock signal until it has been received. Thus, the clock signal is held, in this example, held low, until the launch signal is received. Following receipt of the launch signal the clock to be switched to is monitored until it drops from high to low and then this clock is output. The provision of the launch signal delays output of the new clock, this is useful in test mode as it provides time for things like the scan chain to be disabled and thereby ensures safe timing operation. Embodiments of the present invention are particularly suited for use in DFT mode of operation. This is the design for test mode of operation whereby chips are tested. DFT clocks require the ability to deliver both slow shift clocks as well as fast at speed clocks for use during capture cycles. Delivery and switch over between these clocks must be safe and deterministic with respect to the reference clock. A simple control circuit can be adapted for use with embodiments of the present invention that produce asynchronous glitch-less multiplexers to meet these requirements.

The launch signal can also be used in an embodiment for delivery of at speed DFT clocking. The use of LAUNCH in this embodiment is outlined below. Once PLL lock is obtained at-speed ATPG patterns are delivered with the assertion of BYPASS=1 and LAUNCH=0 controls. Switching to at-speed clocks for captures is accomplished by a sequence similar to:

BYPASS=0 for 1 reference clock
LAUNCH=1 on the next reference clock
LAUNCH=0 on the next reference clock
BYPASS=1 on the next reference clock The number of fast clocks delivered is equal to a count defined by a 4-bit input bus. The fast:slow clock ratio should be sufficient for all fast clocks to be delivered. Extra cycles of reference clock (without input control change) may be inserted between steps 1 and 4 in the above sequence.

During at-speed memory BIST, special bitmapping modes may require serial shift out o the datalogs. This occurs with slow clocks. LAUNCH is asserted for the start of the memory bist. A special count value (0xf) will deliver fast clocks indefinitely. Once failure is observed by the tester, the tester will de-assert LAUNCH and switch to slow clocks with the BYPASS signal until the datalog can be safely read. BYPASS is de-asserted and LAUNCH restarts the memoryBIST from its paused state.

Figure 8:
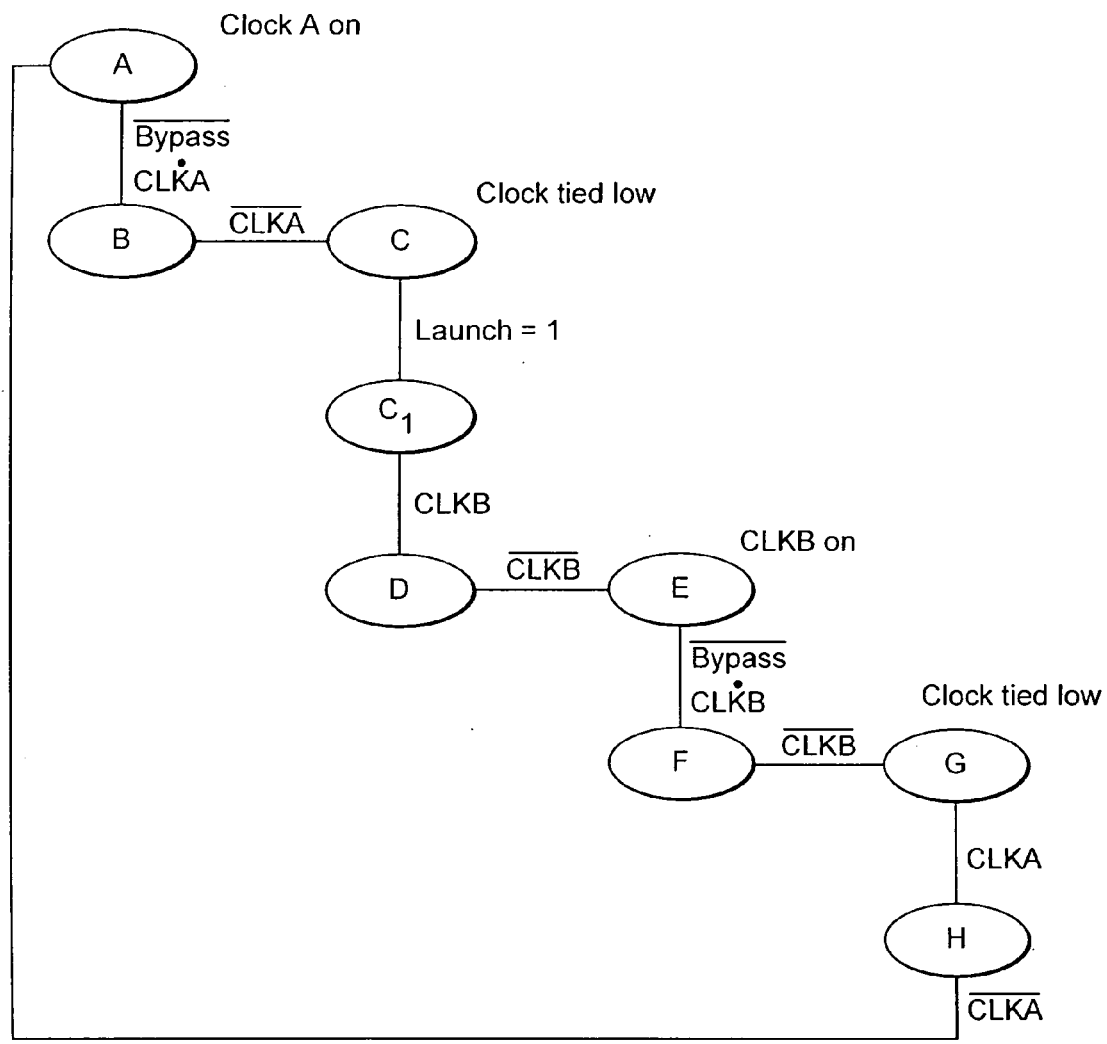
FIG. 8 schematically shows a flow diagram illustrating switching between clocks in test mode according to an embodiment of the present invention.

FIG. 8 schematically shows a flow diagram illustrating the states the processor switches between when operating in DFT mode. These states are very similar to those illustrated rather differently in FIG. 5, but they are slightly more complicated as they have to deal with a "launch" signal as well as a bypass signal. The launch signal introduces the additional state $C_1$, which follows receipt of a launch signal while the output is tied low. An additional difference that is not clearly shown in this illustration is that if the bypass signal is received when clkA is low, clkA is held low immediately. This difference can be clearly seen in FIG. 3B. Note that the "Launch" signal is only present when switching from clkA to clkB, this is from the slow clock to the fast clock. It is this switch that requires the time for the scan chains to be enabled. A further difference with the DFT mode of operation is that in some embodiments switching to the fast clock is only required for a specified number of cycles. In order to accommodate this a 4-bit input in addition to the launch and bypass input is provided. This specifies the number of clock cycles required and the output clock switches to perform these cycles and then the clocks switch back. FIGS. 12 and 13 illustrate this with respect to an ATPG clock sequence and are explained in more detail below.

Further details concerning implementation of embodiments of the present invention are given below.

The generic ARM Clock Synthesis Macro for CPU test chips is specified below, including the external signal I/O pads, phase-locked loop, clock bypass multiplexing, DFT logic, forward and feedback dividers, internal control interface, and any necessary level shifters.

The ARM GTC Clock Synthesis Macro creates a two clock outputs. It is an analog macro with enough flexibility to cover a wide range of applications while placing minimum restrictions on the implementation of an ARM SOC.

The key features include:

2 clock outputs
DFT support (ATPG delay tests)
Programmable output frequency
Internal loop filter components
External clock bypass multiplexer
Output duty cycle of 48 to 52%
Glitchless bypass mux
Power Down The CUSTOM portion of this design is limited to only the VCO domain circuits that are required to support PLL function and DFT test modes. The CTL portion of the circuit is meant to serve as the glue/interface logic between the PLL and its system level controls or external GTC pads. The PLL configuration signals can be driven from one of several sources: external GTC pads, AHB interface, or CP15 interface.

Signals Description

The following table summarizes the GTC PLL signal list:

| | Type | Description |
|---|---|---|
| Test Chip Pads | | |
| PLLREFCLK | IN | Reference clock |
| NRESET | IN | Reset (active low) |
| LAUNCH | IN | Used during DFT mode to open the VCO clock path during fast clock mode |
| PLLTEST | IN | Enable OFT mode |
| PLLCOUNT[3:O] | IN | Sets the number of clock pulses to be delivered during OFT fast clock mode. |
| PLLLOCK | OUT | Lock indicator (active high) |
| CLKTESTOUT | OUT | Test output observation point of the internal clock |
| PLL Configurations | | |
| CLKTESTCTL[3:O] | IN | Selects between all internal docks for viewing on CLKTESTOUT |
| POW ERON | IN | Power down the GTC PLL |
| PLLFBOIV[7:O] | IN | PLL multiplication factor |
| PLLREFDIV[3:O] | IN | Input reference clock divider value |
| PLLOUTDIV1[7:O] | IN | VCO clock output divider value |
| PLLOUTDIV2[7:O] | IN | Clock output divider value |
| BYPASS | IN | Selects between PLLREFCLK and VCO clock |

-continued

| | Type | Description |
|---|---|---|
| Test Chip Pads | | |
| Core Clocks | | |
| CLK1 | OUT | High-speed clock |
| CLK2 | OUT | Slow-speed clock |
| CLK2EN | OUT | Slow-speed clock enable |
| Test Control Scans | | |
| SI | IN | Scan-in for control/observe of PLL controls |
| SO | OUT | Scan-out for control/observe chains |
| SE | IN | Scan enable for control observe chains |
| SCANSEL | IN | Selects between PLL setup and counter chains |

Custom Overview

Figure 9:
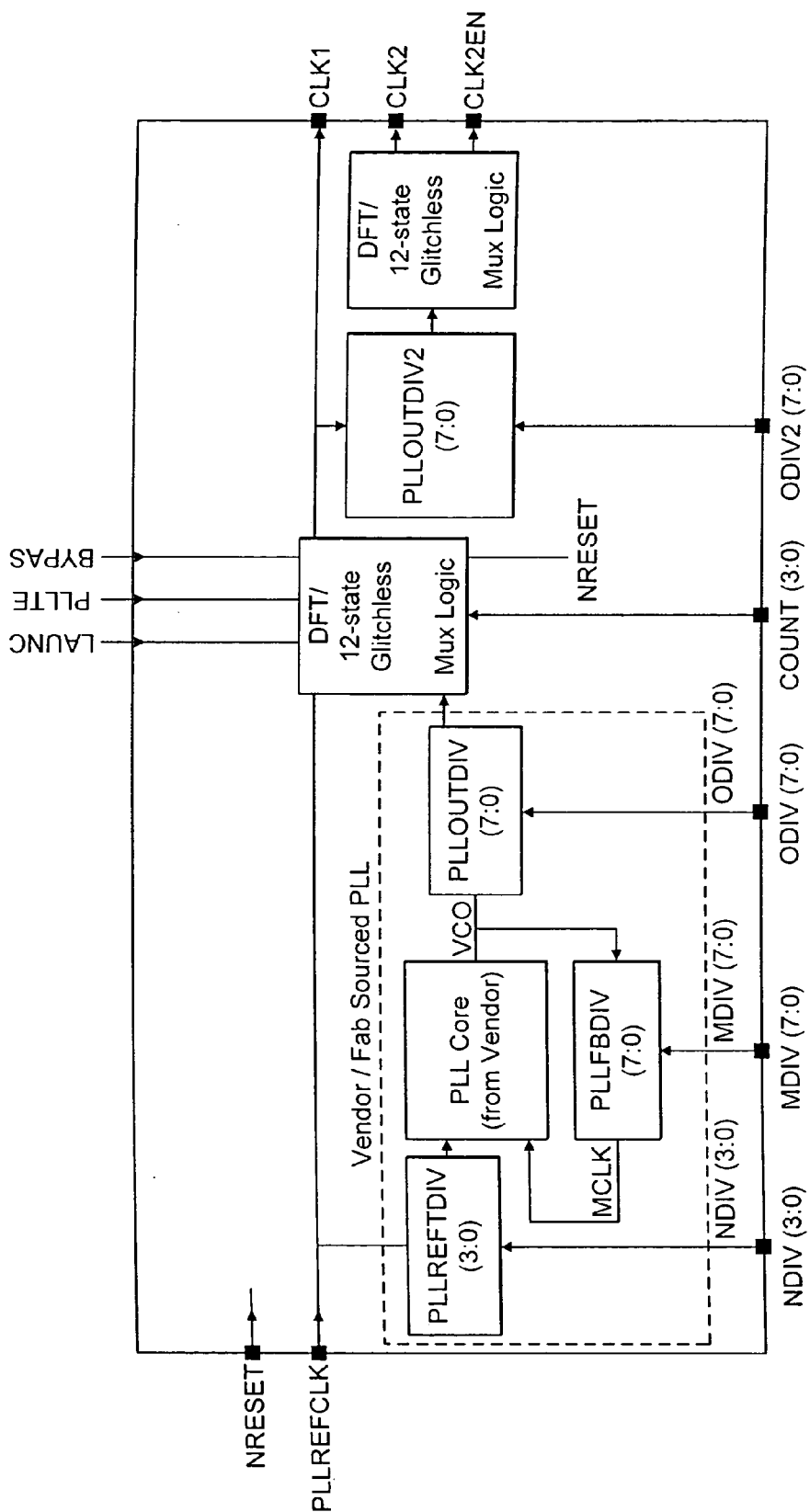
FIG. 9 shows a custom GTC PLL conceptual block diagram.

A conceptual block diagram with I/O is shown in FIG. 9. The pinout interface is separated into the I/O pads on the left side and the internal on-chip control interface on the remaining sides.

FIG. 9 is conceptual only. If implemented in the fashion illustrated, clock skew between CLK1 and CLK2 may cause silicon to be non-operational.

Under a typical operating configuration the output clocks will likely be derived from a 5 MHz–100 MHz external oscillator (FPLLREFCLK). The PLL will not be sensitive to a reference clock duty cycle of better than 30% to 70%. Upon and during reset, the output clocks will bypass the PLL, will be sourced directly from the reference clock PLLREFCLK and will be running. After reset, PLL configuration, and PLL lock, the control interface may turn off bypass mode. The output clock source will be seamlessly switched (via the glitchless mux) from the reference clock to the PLL output without exceeding the frequency or minimum phase time of the faster clock. Whether the output clocks are derived from the PLL in non-bypass mode or sourced from a 50% duty cycle reference clock at less than 100 MHz in bypass mode, the duty cycle degradation will be minimal. Since neither precise phase-lock with external signals nor zero insertion delay is required, the PLL feedback path is completely internal to the macro.

The Clock Synthesis Macro has dedicated Vdd and Vss pins that supply power to both the analog and digital portions of the macro. The macro has it's own supply power in order to allow power measurements to be made only on the SOC without being influenced by the Clock Synthesis Macro. The Clock Synthesis Macro loop filter is internal.

Previous glitchless mux designs allowed for switching between the PLLREFCLK and PLLOUTCLOCK without glitching. Re-use of the same circuit may fail to produce deterministic clock counts (defined by PLLCOUNT) in DFT mode. A new DFT friendly glitchless mux is defined within this document.

Custom Block PLL Interface Description

This section describes the Clock Synthesis Macro input and output signals. PLLREFCLK input This is the reference clock. During reset it will be used to drive the output CLK. If an integrated crystal oscillator is used, it will be one of the connections to the crystal. If an integrated crystal oscillator is not used, an external oscillator will drive PLLREFCLK.

NRESET input This is the reset input into the Clock Synthesis Macro. During reset, NRESET will be driven low for multiple PLLREFCLK cycles and will be used to ensure that CLK1 is driven by PLLREFCLK during this time.

MDIV[7:0] input These signals are feedback divider that defines the PLL multiplication factor.

NDIV[3:0] input These signals are forward divider that defines the PLL input reference clock divider.

ODIV[7:0] input These signals are outputs divider from the VCO.

ODIV2[7:0] input These signals are outputs divider from the glitchless mux.

BYPASS input This signal is used to control the selects of the Clock output mux and the DFT VCO path. Bypass should be reset to 1'b0 to insure safe start up with an PLLREFCLK clock outputs.

PLLTEST input This signal is used to enable DFT modes and should be held low during mission mode.

PLLCOUNT[3:0] input This signal is used to set the number of clock pulses to be delivered during DFT fastclock mode.

PLLCOUNT may change during ATPG testing but should be static during LAUNCH and at least one reference clock before and after LAUNCH.

PLLCOUNT=0xf is a special count allowing for continual delivery of fast clocks.

LAUNCH input This signal is used during DFT mode to open the VCO clock path during fast clock mode. Use of this signal allows for glitch free transitions to have completed to the VCO domain.

CLK1 output This is the high-speed clock. The Clock Macro should be able to drive CLK1 at maximum frequency under all process conditions. During reset, CLK1 should be driven by the input PLLREFCLK.

CLK2 output This is the low-speed clock. It is derived from CLK1 via the ODIV2 divider.

CLK2EN output This is an enable that is used if the crystal oscillator is external. If the crystal oscillator is internal, then this is the output from that oscillator, CLK2.

Synchronizing Launch: If the user asserts Launch one ref cycle after Bypass falls, the custom block will see both signals change at the same time. This is because Bypass goes through a synchroniser and Launch does not. We must either put Launch through a synchronizer or we must state that launch can rise at least 2 ref cycles after Bypass falls.

Divide values: Divide values are stable before the part comes out of reset for DFT mode. In functional mode, divide values may change on the fly. Divider outputs will not be safe to use until at least 212 cycles after a new divide value is introduced. Divide by 1 is allowed In powerdown mode, the Glitchless MUX will go back into bypass mode The TCI VCO flatlines immediately after it is told to powerdown.

DFT Description

Numerous DFT features require the below described functionality. Transition delay and path delay patterns require at speed functional clocks to occur in small "bursts" (VCO based) while being surrounded by slow shift clocking (reference clock based). At speed memory bist also requires the ability to slow shift output datalogs upon detection of fail. This is best handled at the PLL, switching between PLLREFCLK and VCO domains through tester control. External tester controlled clock gating within the core macro becomes increasingly difficult as frequency targets rise. The below table specifies required settings for the custom block's signals. Constraining of most dividers allows for numerous assumptions to be made in the design of the custom circuits (example: output clock will never be slower than input reference clock). Signals which are recommended for external pinout should be ported to either dedicated SOC pins or shared SOC functional pins (as defined by testmode).

DFT PLL Signal Requirements Table:

| Signal | Value | Comment |
|---|---|---|
| BYPASS | Ext | Tied to external Pin(s) |
| PLLREFDIVI3:OI | 0000 | No Input reference divide |
| PLLOUTDIV1 | 00000000 | Output Clocks 1:1 |
| PLLOUTDIV2 | 00000000 | Output Clocks 1:1 |
| PLLREFCLK | Ext | Tied to external Pin(s) |
| NRESET | Ext | Tied to external Pin(s) |
| CLKTESTCTL[3:OJ | *Ext* | Tied to external Pin(s) |
| CLKTESTOUT | Ext | Tied to external Pin(s) |
| POWERON | 0 | Force Power Down Disable |
| PLLFBDIV[7:OJ | *Ext* | Tied to external Pin(s) |
| PLLTEST | Ext | Tied to external Pin(s) |
| COUNT[3:OJ | *Ext* | Tied to external Pin(s) |
| LAUNCH | Ext | Tied to external Pin(s) |

*Ext*: Preferred tie to external pin but could also be controlled by scan only registers during test setup procedures.

Implementation may allow for external pinout of these signals to allow for DFT flexibility in methodology development. Forced set points/tie offs in the above table may be accomplished by controlling the CTL block logic with TESTMODE.

DFT PLL Control/Setup

Figure 10:
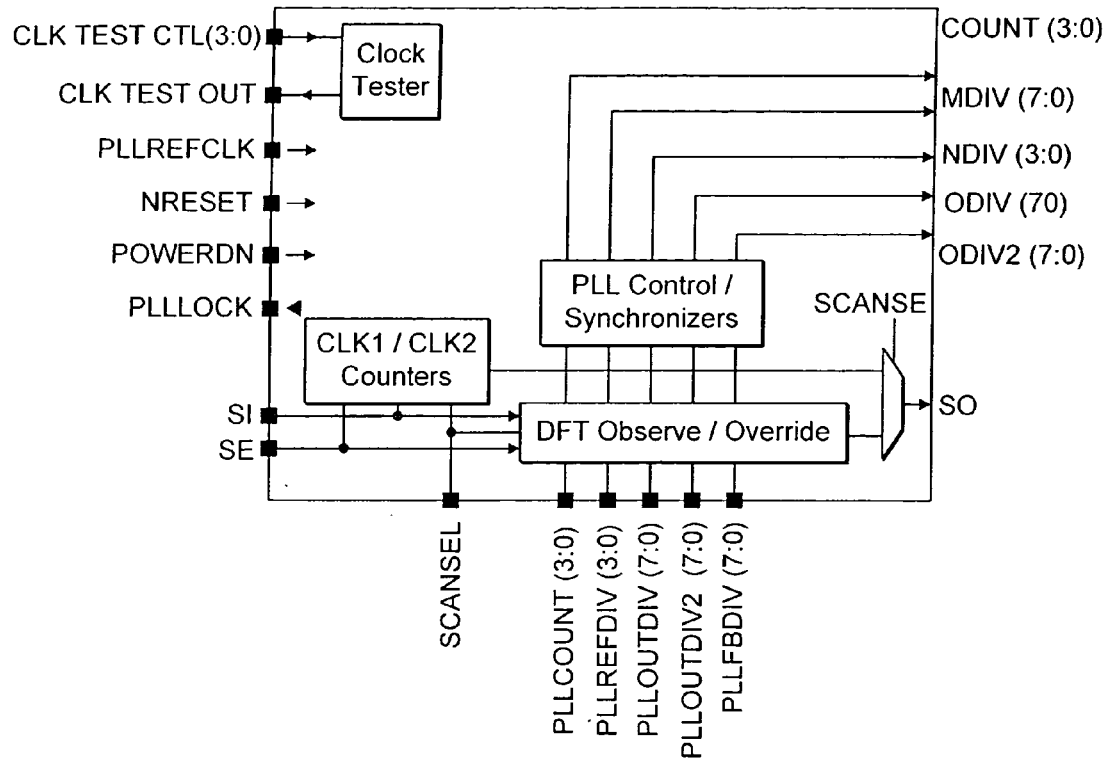
FIG. 10 shows a control GTC PLL conceptual block diagram.

A conceptual block diagram with I/O is shown in FIG. 10.

The control block provides interface logic between the PLL and the GTC-level controls. It has logics to make the internal clocks visible to the external pin depends on the clocking mode entered. Since the Generic Test Chip PLL can be optionally be driven by an AHB interface, the control block contains full synchronizers to capture various divide-by values safely. These synchronizers are running at the PLLREFCLK rate, which is typically the slowest frequency.

DFT Observe/Override Description

The DFT observe/override block serves two functions. First the scannable register allows for manual override of the control signals being delivered to the PLL counters. This is an important feature to allow for configuration of control signals by tester control without requiring high pin count access controls to be delivered through the SOC. It should be noted that this macrocell may be provided to customers of our cores and the configuration of the PLL is required for at speed ATPG or MBIST testing. Internal ARM testchip application will still rely upon direct control of the signals as the pinout to external pads is pre-existing. Second, this scan register can also serve as observe points for SOC logic control, allowing for scan chain use during SOC test. This is a limited feature however since the REFCLK clocking of these registers is not skew balanced (early clocking) relative to the SOC. All at-speed testing of SOC logic should have SCANSEL=0 to activate counter chains. Use of the setup register during at speed test will result in potential loss of PLL lock and may include skew problems as previously mentioned.

Figure 11:
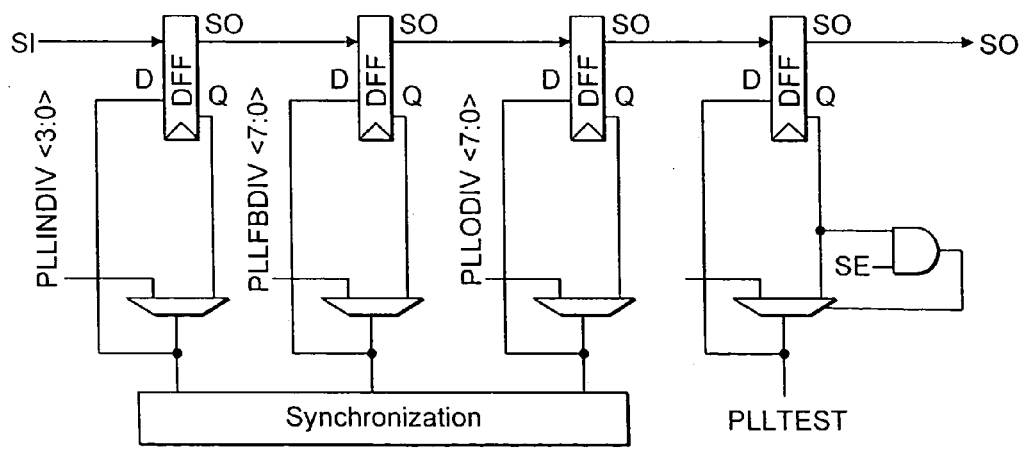
FIG. 11 shows an override chain.

The control signals can be overridden by a re-settable override register found within the scan chain. FIG. 11 shows construction of the override chain:

All F/Fs in this chain are clocked by REFCLK

Tail member of chain (PLLTEST) must be a re-settable DFF

Output to Synchronization circuits follow SOC inputs unless enabled by PLLTEST DFF PLL LOCK hazard exists for DFT if SE is active during ATPG load/unload. SCANSEL=0 should be used after initial setup to prevent chain activation.

Observe DFFs always active with REFCLK. Should constrain PLLTEST register to zero during ATPG.

DFT Counter Registers

Two 8-bit counters are also provided for counting of the primary clock outputs during ATPG at-speed tests. This is useful to insure that proper clock counts were delivered to the external clock tree. This also serves as a useful counter for testing the DFT ATPG modes in standalone PLL functional test. The counters are not provided within the previously described override scan chain, since accessing this chain during ATPG test may result in a loss of PLL lock due to changing counter values. Note: a second chain removes the requirement for using shadow DFFs and updates for this setup configuration.

Inclusion of this counter chain with the core during ATPG test is also allowed. A transparent phase2 lockup latch is found at the end of this chain to facilitate safe shifting.

PLL Chain Use During Test

PLL scan chain usage for at-speed test of logic:

1) Scan load of PLL control registers to perform PLL setup. (SCANSEL=1)

2) Wait for required Lock time

3) Perform ATPG at-speed testing option to stitch the PLL counter chains.

SCANSEL=0 held throughout ATPG test.

PLL scan chain usage for stuck-at SOC control logic:

1) Recommend inclusion of PLL setup chain (SCANSEL=1) to serve as observation register.

DFT Restrictions

The test mode features described here assume a 2:1 or greater VCO to PLLREFCLK ratio. Test needs for lower ratios will always rely upon bypass mode and will not make use of the VCO circuit. The reference clock and output clock dividers shall be forced to 1:1 whenever PLLTEST and ATPG/BIST are active. Failure to do so may result in un-deterministic start/stop of clocks with respect to expected DFT functions. Use of non 1:1 ratios while PLLTEST is active should be used for PLL testing and debugging only.

The DFT circuit is safe because of the external control provided under ATPG direction. BYPASS is synchronized within the PLL to prevent glitch pulses. LAUNCH should be asserted at least one full PLLREFCLK after BYPASS goes low to select the VCO domain. LAUNCH should be deasserted at least one cycle before BYPASS is toggled to select PLLREFCLK for the unload sequence. Care should be taken during the construction of the capture sequence to insure that a sufficient number of cycles are available for all VCO clocks to be delivered safely, including setup cycles (Ex: 2:1 FBDIV with 8 capture clocks desired cannot be completed within 2 reference clocks, needs 8/2+2 setup+1 end. This becomes easier to manage with increasing FBDIV).

The CLK2 ratio MUST be 1:1 with respect to CLK1 output. CLK1 assumed to be the faster of the two clocks. For example, if CLK1:CLK2 ratio is 16:1 and two fast ATPG pulses are delivered, CLK2 may violate minimum duty cycle, and the end state is undefined.

SUMMARY

All clock domains with differing frequencies are tested separately for at-speed testing.

CLK2 domain should be clocked at 1:1 ratio with respect to CLK1.

SCANSEL=1 used for initial PLL setup or for observe of SOC control logic during stuck-at fault testing.

SCANSEL=0 used during at-speed testing to monitor clock pulse delivery.

DFT Example Waveforms

FIGS. 12 and 13 show an ATPG capture sequence that provides two complete capture cycles. The PLL has been programmed to a 4:1 ratio for CLK1:CLK2. FIGS. 14 and 15 show BIST clock sequences.

This section describes the ARM GTC Clock Synthesis Macro input and output signals.

| Signal | Direction | Description | | Notes |
|---|---|---|---|---|
| PLLREFCLK | input | This is the reference clock. | | |
| NRESET | input | This is the reset input into the Clock Synthesis Macro | | |
| CLKTESTCTL[3:0] | input | These pins are test control inputs which are used to select from the all of the internal clocks of the Clock Synthesis Macro for viewing on CLKTESTOUT. These pins are not internally synchronized before use, implying that the Clock Synthesis Macro may glitch. Below is a table that defines the behaviour when using CLKTESTCTL[3:0]. | | |
| | | | DESCRIPTION | NOTES |
| | | 0000 | Normal mode of operation. CLKTESTOUT = 0. Crystal oscillator enabled. | |
| | | 0001 | CLKTESTOUT = CLK1 | High Frequency Clock |
| | | 0010 | CLKTESTOUT = CLK1 divided | CLK1 divided output, not ODIV output. Divide ratio set by loading DFT count chain |
| | | 0011 | CLKTESTOUT = CLK2 | Bus Clock (usually slower than CLK1) |
| | | 0100 | CLKTESTOUT = CLK2EN | |
| | | 0101 | CLKTESTOUT = VCO | |
| | | 0110 | CLKTESTOUT = PLLREFCLK | |
| | | 0111 | CLKTESTOUT = Clk1SelOut | From custom VCO circuitry |
| | | 1000 | CLKTESTOUT = Clk2SelOut | From custom VCO circuitry |
| | | 1001 | CLKTESTOUT = OdivMatch | From custom VCO circuitry |
| | | 1010 | Partner specified outputs | |
| | | 1011 | Partner specified outputs | |
| | | 11xx | Partner specified outputs | |
| CLKTESTOUT | output | This is a test output observation point for various internal clocks. | | |
| POWERDN | input | When this signal is high, the VCO will be powered down and will draw no more than the minimum leakage current, and the VCO lock will be lost. Under the typical operating configuration, the PLL must be placed in bypass. POWERDN shall be reset to an active state. | | |
| MDIV[7:0] | output | These signals specify the PLL multiplication factor. | | |
| NDIV[3:0] | output | These signals specify the PLLREFCLK divide values. | | |
| ODIV[7:0] | output | These signals specify the VCO output divide values. | | |
| ODIV2[7:0] | output | These signals specify the CLK2 divide values. | | |
| PLLFBDIV[7:0] | input | These signals control the M divider that defines the PLL multiplication factor. Note that the value programmed actually is a multiplication factor of PLLFBDIV[7:0] + 1. PLLFBDIV[7:0] shall be reset to 8'b00000000, the lowest multiplication factor, and may be externally programmed via a core instruction. | | |
| PLLREFDIV[3:0] | input | These signals control the N divider that defines the input PLLREFCLK divider. Note that the value programmed actually is a divide value of PLLREFDIV[3:0] + 1. PLLREFDIV[3:0] shall be reset to 8'b0000, the lowest divide value, and may be externally programmed via a core instruction. | | |
| PLLOUTDIV1[7:0] | input | These signals control the VCO output divider. Note that the value programmed actually is a divide value of PLLOUTDIV1[7:0] + 1. PLLOUTDIV1[7:0] shall be reset to 8'b00000000, the lowest divide value, and may be externally programmed via a core instruction factor, and may be externally programmed via a core instruction. | | |
| PLLOUTDIV2[7:0] | input | These signals control the CLK2 output divider.. Note that the value programmed actually is a divide value of PLLOUTDIV2[7:0] + 1. PLLOUTDIV2[7:0] shall be reset to 8'b00000000, the lowest divide value, and may be externally programmed via a core instruction. | | |
| PLLLOCK | output | Lock Indicator. Upon power-up reset, this signal is de-asserted for about 512 PLLREFCLK cycles to allow the VCO enough time to establish a lock. Also, whenever the reference divider or the feedback factor is updated by the user, this signal will be de-asserted for 512*PLLREFDIV of PLLREFCLK cycles. | | |
| SI | input | Scan data Input | | |
| SE | input | Scan Enable | | |
| SO | output | Scan data Output | | |
| SCANSEL | input | Scan chain select, setup or counter chain select. | | |

Output Clock Behaviour

The PLL outputs, CLK1 and CLK2, are defined by the inputs PLLFBDIV[7:0], PLLREFDIV[3:0], PLLOUTDIV1[7:0], PLLTEST, PLLCOUNT[3:0], LAUNCH, BYPASS, and POWERDN. It is a strict requirement that the output clocks be driven by PLLREFCLK during reset. It is also a requirement that CLK1 and CLK2 have are glitch-free and also have approximately a 50% duty cycle.

A glitch can be generated when a mux switches from one input clock to the other input clock. The resultant output clock should not have a pulse smaller than either of its inputs. If a pulse exists which is smaller than either of the input clocks, then the output is said to have "glitched". All clock switching should be done such that no glitches occur to the outputs CLK1 and CLK2.

When reprogramming CLK1 and CLK2, the following table defines the behaviour of both clocks (note that table does not account for lock detection).

| PLLTEST | LAUNCH | BYPASS | POWER DN | Internal VCO | CLK1 | CLK2 | Comment |
|---------|--------|--------|----------|--------------|------|------|---------|
| x | x | x | 1 | 0 | PLLREFCLK | PLLREFCLK | |
| o | x | 0 | 0 | Active | VCO | VCO/PLLOUIDIV2 | |
| o | x | 1 | 0 | Active | PLLREFCLK | PLLREFCLK | |
| 1 | 0 | 1 | 0 | Active | PLLREFCLK | PLLREFCLK | PLLREFCLK via DPI |
| 1 | 0 | 0 | 0 | Active | 0 | 0 | Dead cycles surrounding |
| 1 | 1 | 0 | 0 | Active | VCO* | VCO" | Number of dock cycles as defined by PLLCOUNT |
| 1 | 1 | 1 | x | — | — | — | Illegal state |

The only time this table does not apply is when the Clock Synthesis Macro is placed in one of the defined test modes by CLKTESTCTL[3:0]. Please see the CLKTESTCTL[3:0] description in:

Terms and Specifications

The input reference frequency is to be 5 MHz–40 MHz when driven from integrated crystal oscillator and 5 MHz–100 MHz when driven from an external oscillator.

The output duty cycle is to be equal to or better than 48%–52% when driven from the PLL, the crystal oscillator (via bypass), or a 50% duty cycle external oscillator (via bypass).

The PLL output frequency should be able to drive the ARM core at its maximum rated speed under all conditions given an input reference frequency as defined above. This condition should be satisfied under ALL process conditions.

The minimum PLL output frequency should be at least one octave less than the maximum.

The operating power consumption should be no more than 50 mW under the typical operating configuration and any process conditions.

The power-down power consumption should be no more than leakage current.

The lock time should be less than 150 uS under the typical operating configuration.

The cycle-to-cycle jitter should be less than 150 pS under the typical operating configuration.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims. For example, various combinations of the features of the following dependent claims could be made with the features of the independent claims without departing from the scope of the present invention.

We claim:

1. A processor clock control device operable to control switching between clock signals input to a processor, said processor clock control device comprising:

at least two clock signal inputs each operable to receive a clock signal, said clock signals comprising a first and a second clock signal;

a sensor operable to sense said first and said second clock signals;

a clock signal output operable to output a clock signal for input to a processor; and a clock switching signal input for receiving a switching signal operable to control switching of said clock signal output from said first clock signal to said second clock signal; wherein:

said processor clock control device is operable on receipt of said switching signal to sense said first clock signal and if said first clock signal is at a second level when said switching signal is received, said processor clock control device is operable to hold said clock signal output at said second level, and then to sense said second clock signal and when said second clock signal transitions from a first level to said second level to output said second clock signal.

2. A processor clock control device according to claim 1, wherein following receipt of a clock switching signal, said clock switching signal input is inhibited from receiving further signals until said processor clock control device outputs said second clock signal.

3. A processor clock control device according to claim 1, further comprising a plurality of set/reset flip flops and logic gates.

4. A processor control device according to claim 1, further comprising a further clock signal input.

5. A processing apparatus including the processor control device of claim 1.

6. A processor clock control device operable to control switching between clock signals input to a processor, said processor clock control device comprising:

at least two clock signal inputs each operable to receive a clock signal, said clock signals comprising a first and a second clock signal;

a sensor operable to sense said first and said second clock signals;

a clock signal output operable to output a clock signal for input to a processor; and a clock switching signal input for receiving a switching signal operable to control switching of said clock signal output from said first clock signal to said second clock signal, wherein:

said processor clock control device is operable on receipt of said switching signal to sense said first clock signal and when said first clock signal is detected at a second level, said processor clock control device is operable to hold said clock signal output at said second level, and then to sense said second clock signal and when said second clock signal transitions from said first predetermined level to said second level to output said second clock signal, and said processor clock control device further comprises a further clock switching signal input operable to receive a further switching signal, said processor clock control device being operable to sense said second clock signal only after receipt of said further switching signal.

7. A processor clock control device according to claim 6, wherein said processor clock control device is operable to sense said first clock signal and if said first clock signal is at said second level when said switching signal is received said processor clock control device is operable to hold said clock signal output at said second level.

8. A processor clock control device according to claim 6, wherein said processor clock control device is operable to sense said first clock signal and when said first clock control device transitions from a first predetermined level to a second level said processor clock control device is operable to hold said clock signal output at said second level.

9. A processor clock control device according to claim 6, wherein said further switching signal, comprises a switch signal component and a number component, said processor clock control device being operable to sense said second clock signal only after receipt of said switch signal component and to output said second clock signal for a number of cycles specified by said number component.

10. A processor clock control device according to claim 6, wherein said clock switching signal input further comprises logic operable to inhibit forwarding of said received clock switching signal to said processor clock control device until said first clock signal reaches said first predetermined level.

11. A processor clock control device according to claim 6, wherein said logic operable to inhibit forwarding of said received clock switching signal to said processor clock control device comprises a register that is clocked by said first clock signal at said first predetermined level.

12. A processing apparatus comprising:
a processor comprising a clock signal input;
at least two clocks each operable to output a clock signal; and
a processor clock control device according to claim 10 being operable to control which one of said at least two clock signals is to be input to said processor clock signal input.

13. A method of switching between clock signals to be output comprising the following steps:
outputting a first clock signal;
receiving a clock switching signal;
sensing a first clock signal and if said first clock signal is at a second level when the clock switching signal is received, holding said sensed first clock signal at said second level and outputting said held signal; and
sensing said second clock signal and when said second clock signal transitions from said first predetermined level to said second level, outputting said second clock signal.

14. A method according to claim 13, comprising a further step:
following the step of receiving of said clock switching signal, inhibiting receipt of further input signals, and
following the step of outputting said second clock signal, allowing receipt of further input signals.

15. A method of switching between clock signals to be output comprising the following steps:
outputting a first clock signal;
receiving a clock switching signal;
sensing a first clock signal and when said first clock signal is at a second level, holding said sensed first clock signal at said second level and outputting said held signal;
receiving a further switching signal, and after receipt of said further switching signal, sensing said second clock signal and when said second clock signal transitions from said first predetermined level to said second level, outputting said second clock signal.

16. A method according to claim 15, wherein in said step of sensing a first clock signal, if said first clock signal is at said second level when said switching signal is received, holding said sensed first clock signal at said second level and outputting said held signal.

17. A method according to claim 16, wherein in said step of sensing a first clock signal, if said first clock signal is at said first level when said switching signal is received sensing a transition from a first level to said second level and holding said sensed first clock signal at said second level and outputting said held signal.

18. A method according to claim 16, wherein said further switching signal comprises a switch signal component and a number component, said step of sensing said second clock signal being performed only after receipt of said switch signal component and said step of outputting said second clock signal being performed for a number of cycles specified by said number component.

19. A method according to claim 16, wherein said receipt of said clock switching signal is inhibited until said first clock signal reaches said first predetermined level.

* * * * *